United States Patent [19]

Birchmire, III et al.

[11] Patent Number: 4,932,362

[45] Date of Patent: Jun. 12, 1990

[54] ONE FINGER QUICK RELEASE ANIMAL COLLAR

[76] Inventors: Thomas H. Birchmire, III, 1417 Oriole Ave., Orlando, Fla. 32803; Markus V. Ziesmer, 606 Minnehaha La., Maitland, Fla. 32751

[21] Appl. No.: 164,865

[22] Filed: Mar. 7, 1988

[51] Int. Cl.⁵ .............................................. A01K 27/00
[52] U.S. Cl. ....................................... 119/96; 119/114
[58] Field of Search ............... 119/114, 111, 109, 106, 119/110, 96

[56] References Cited

U.S. PATENT DOCUMENTS

| | | |
|---|---|---|
| 1,020,242 | 3/1912 | Wilson . |
| 2,356,715 | 8/1944 | Webster . |
| 2,680,315 | 6/1954 | McHugh et al. ........... 119/106 |
| 2,900,696 | 8/1959 | Bacon ......................... 119/106 |
| 3,074,378 | 1/1963 | Clayton ...................... 119/111 |
| 3,099,250 | 7/1963 | Soles, Jr. ................... 119/114 |
| 3,292,226 | 12/1966 | Foster ........................ 119/114 |
| 3,310,034 | 3/1967 | Dishart ...................... 119/106 |
| 3,589,341 | 6/1971 | Krebs ..................... 119/109 X |
| 3,757,744 | 9/1973 | Pravaz ......................... 119/96 |
| 4,174,553 | 11/1979 | Schrougham et al. ..... 119/106 X |
| 4,180,016 | 12/1979 | George ....................... 119/106 |
| 4,676,198 | 6/1987 | Murray .................... 119/109 X |
| 4,759,311 | 7/1988 | Boyle .......................... 119/96 |
| 4,817,562 | 4/1989 | Giroux ......................... 119/96 |

FOREIGN PATENT DOCUMENTS

| | | | |
|---|---|---|---|
| 1174917 | 9/1984 | Canada .......................... 119/96 |
| 771930 | 10/1934 | France . |
| 980863 | 1/1965 | United Kingdom . |

Primary Examiner—Robert P. Swiatek
Assistant Examiner—Nicholas D. Lucchesi
Attorney, Agent, or Firm—Julian C. Renfro

[57] ABSTRACT

A leash and collar or harness combination permitting, in accordance with this invention, a handler by the use of one finger or thumb to readily release an animal or child wearing the collar or harness. The leash and collar or harness comprises a device enabling it to be secured tightly yet confortably around the animal or child in a semi-permanent manner. An essentially flat, somewhat elongate component regardable as a male member is secured to the collar or harness so as to protrude therefrom for at least one inch. A flexible leash is intended to be utilized in combination with the collar or harness, such leash having on one end a female latching member in which is disposed a slot for releasably receiving the essentially flat component. A suitable latching device is located inside the female member adjacent the slot, which latching device is arranged to engage the essentially flat component at the time of its insertion into the slot. The latching device includes a spring, the female member also having a release button whereby the handler can readily move the latching device against the spring bias to a release position. The leash is attachable to the collar or harness merely by causing the essentially flat component to slide into the slot, where it automatically becomes latched. Importantly, the release of the animal or child, even if struggling, can be readily achieved by the handler pressing the release button with one finger to overcome the spring bias.

10 Claims, 5 Drawing Sheets

FIG 3
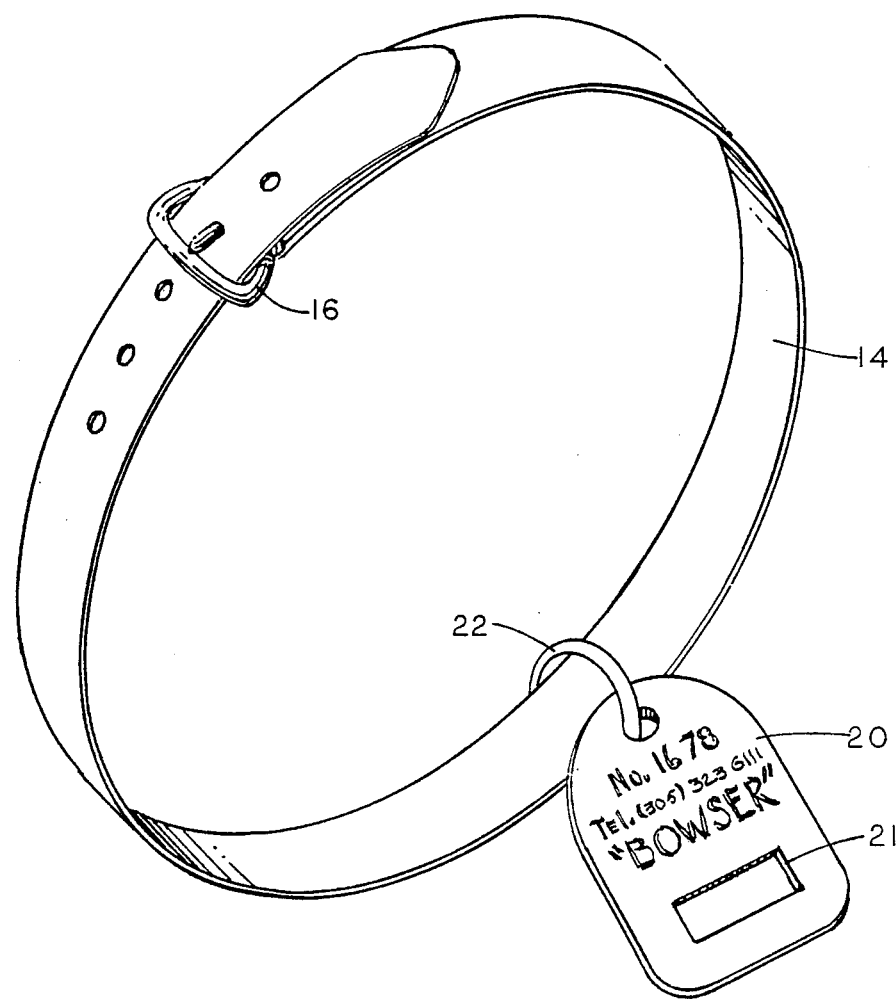
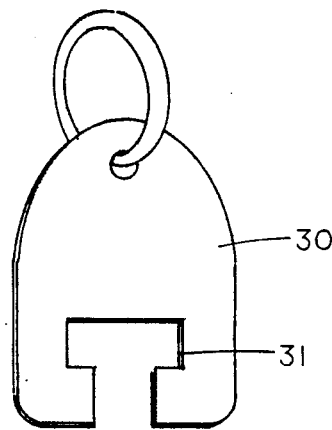
FIG 4
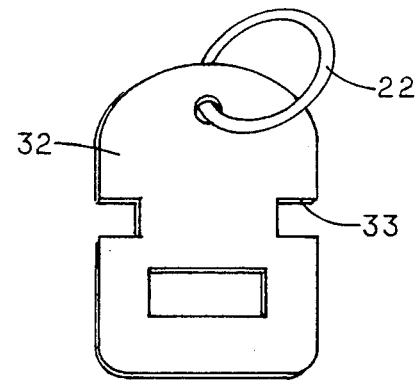
FIG 5

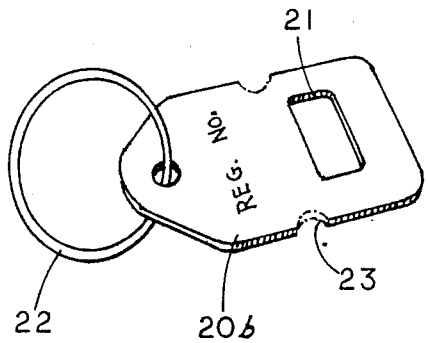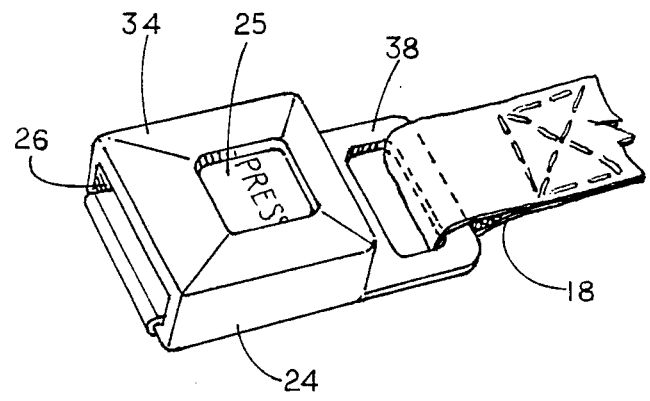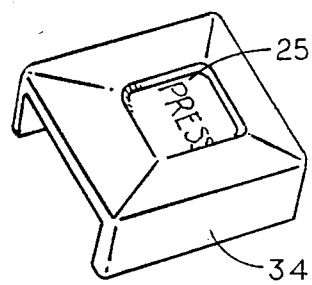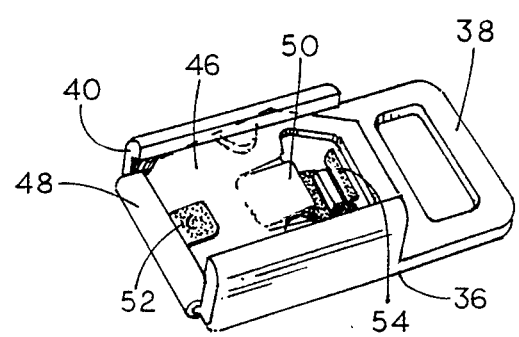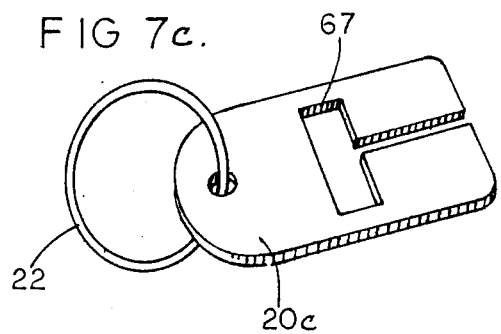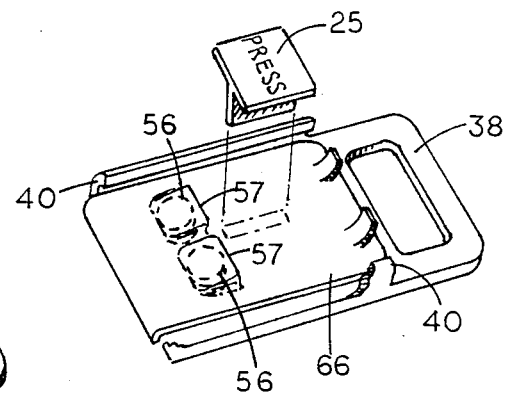

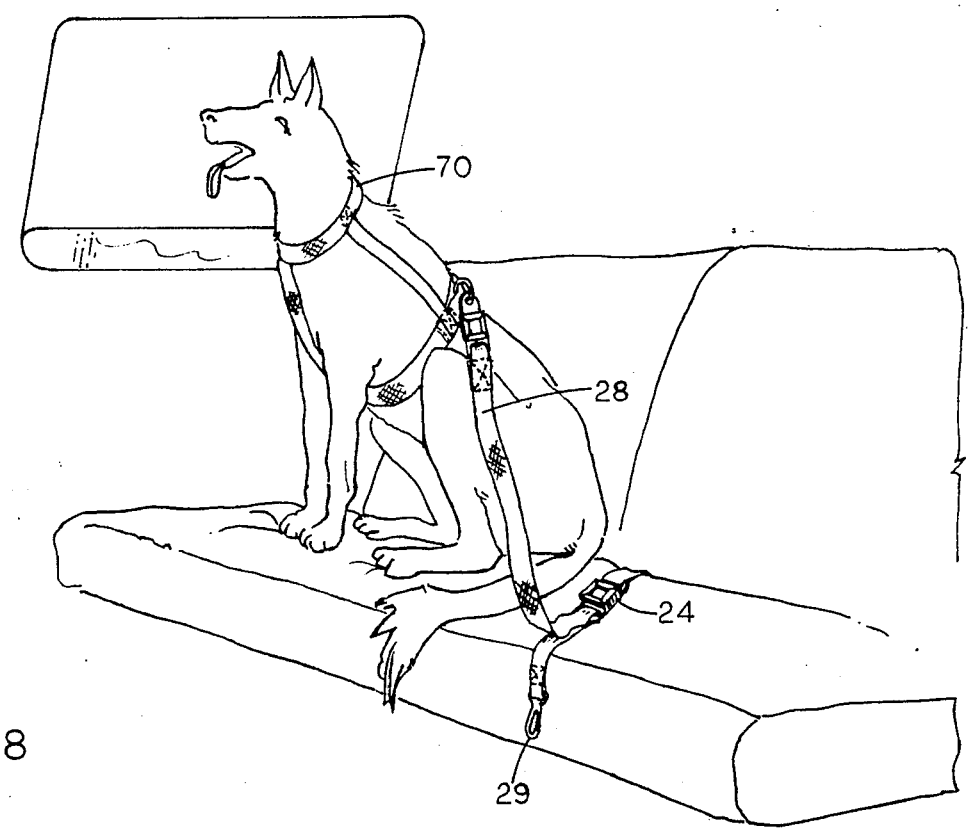
FIG 8
FIG 9
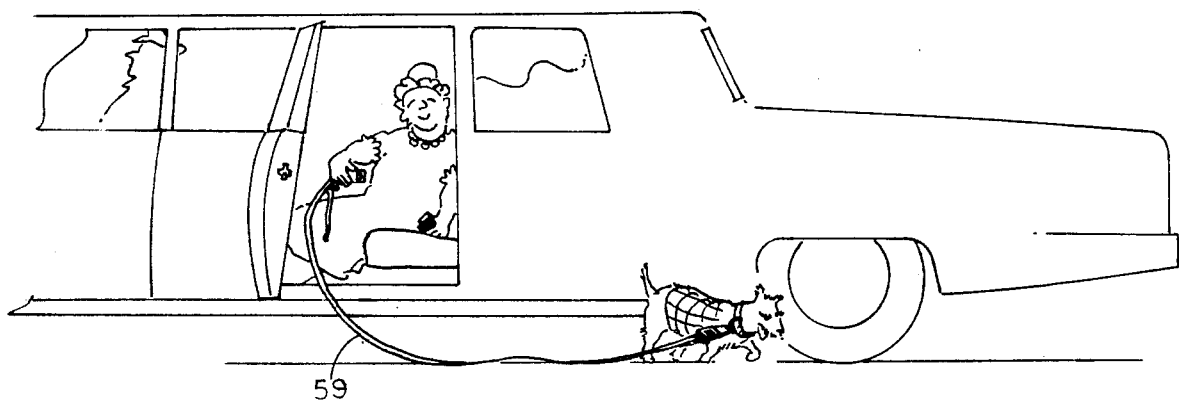

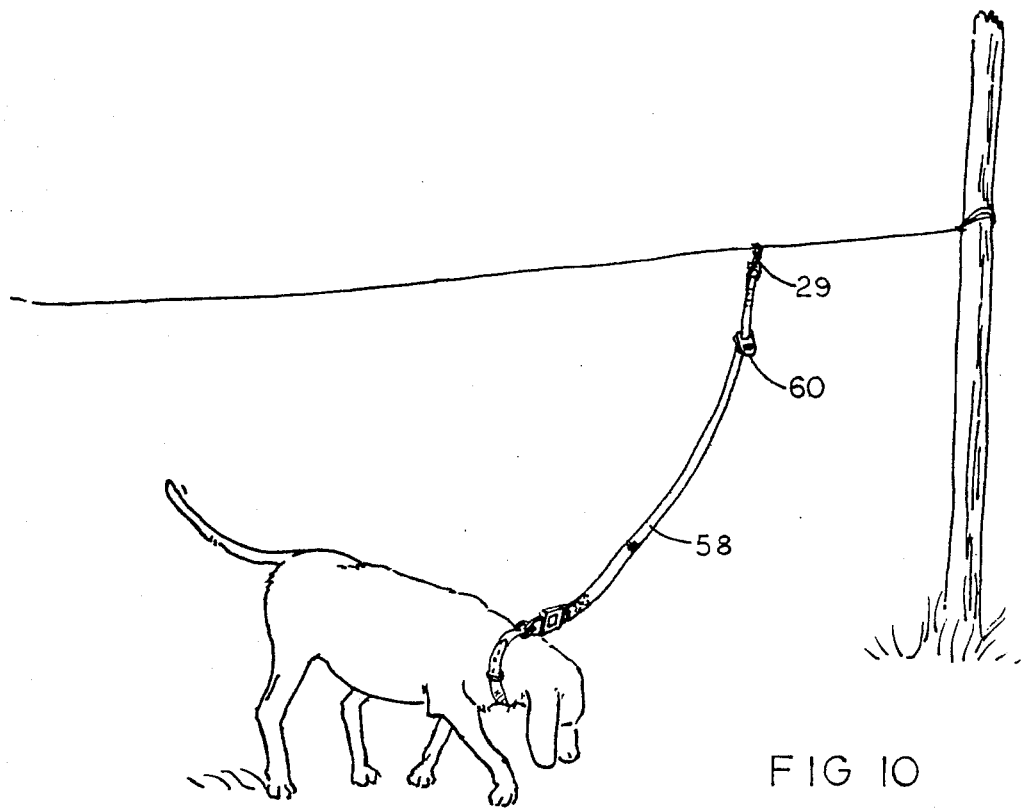
FIG 10
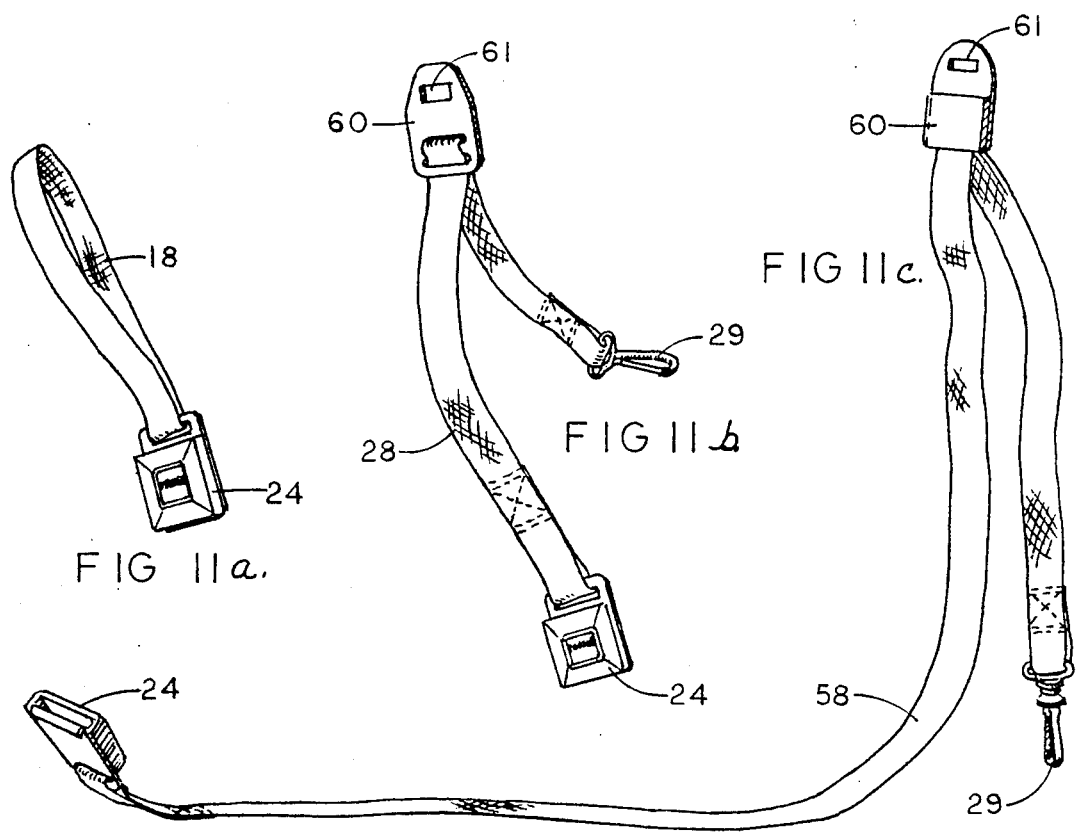
FIG 11a.
FIG 11b.
FIG 11c.

ONE FINGER QUICK RELEASE ANIMAL COLLAR

BACKGROUND OF THE INVENTION

Many attempts have been made in the past to provide dog restraining or controlling means so designed that the animal may be instantly released when desired. All such prior proposed devices, however, have failed to be releasable by the use of only one hand. Many of the prior art devices enable the animal to be quickly released if the handler grasps one part of the restraint means, such as the collar, and then uses the other hand to manipulate the release button used on the latching arrangement of the restraint means. If the dog actively turns and twists about, as many of them do, the release of the animal becomes much more difficult, in view of the fact that the handler must struggle against the pulling of the dog in order to hold the components in a manner that makes release possible.

Another point to keep in mind is that the handler of the animal may, because of injury or infirmities due to age, have only one usable hand, and in such an instance, the release of a struggling animal from conventional latching means becomes almost impossible.

With regard to pertinent prior art devices, U.S. Pat. No. 244,312 discloses a fastening device which includes a pair of curved plates which are adapted to be releasably joined together by aligning a pair of projections on one with mating openings on the other. Upon turning the projections they cannot pass through the registered openings and lock the plates together. The ends of the collar are fixed to respective ends of each plate.

U.S. Pat. No. 2,097,070 discloses a rather complex fastener providing a protective locking device. While a channel like body member is disclosed, it is employed in a quite different manner than that taught by the Applicants, and does not function or cooperate with the other elements in a similar manner as disclosed in the present invention.

U.S. Pat. No. 272,036 is representative of many others which disclose the concept of providing means in which to hold and display owner information on the collar. However, like the above-noted patents it is believed that there is no showing or suggestion of the unique combination as taught by Applicants in the present invention.

None of these patents disclose a leash and animal collar combination of inexpensive construction that permits the handler to readily effect, by one hand, the immediate release of an animal that may be struggling to get free.

SUMMARY OF THE INVENTION

A leash and animal collar combination in accordance with this invention advantageously permits the handler by the use of one finger or thumb to readily release the animal wearing the collar, even though the animal may be jumping and turning. A preferred embodiment of our invention comprises an animal collar having means enabling it to be secured tightly yet comfortably around the animal in a semi-permanent manner. Obviously the collar is removable, but in accordance with the present invention, it is intended for the collar to remain on the animal, even though it be necessary for the handler to suddenly release the animal to let it run free. For this reason we feel it appropriate to regard the animal's collar as being semi-permanently affixed around the animal's neck, or over the shoulders in the case of a shoulder harness.

In accordance with our invention, a substantially flat and somewhat elongate component or member is secured to the collar so as to protrude therefrom for a short distance, typically an inch or more, which component or member at all times remains on the collar. At the end of the flexible leash intended to be utilized in combination with this collar and substantially flat component is a female member in which is disposed a slot for releasably receiving the generally flat member. Latching means are located inside the female member adjacent the slot, which latching means is arranged to automatically engage the substantially flat component or member at the time of its insertion. The latching means includes a spring, with the female member also having a single release button that enables the handler, when he or she desires, to readily move the latching means against the bias of the spring, to a position in which the substantially flat component is released. It is to be realized that the leash is attachable to the collar merely by causing the substantially flat component to slide into the slot, where it automatically becomes latched. Most advantageously, the release of the animal, even if struggling, is readily achieved by the handler pressing the release button with finger or thumb so as to overcome the bias of the spring.

It is also important to realize that one-handed reconnection is also possible.

It is therefore a principal object of our invention to provide a leash and animal collar combination of low cost and highly effective construction, that advantageously enables an animal, such as a large dog, to be released by the use of only one hand, even though the animal may be struggling to get free.

It is another object of our invention to provide an animal collar equipped with a substantially flat component or tab, which component may be readily received in a latching relationship in a female attachment member provided at the end of a leash, but from which the flat component or tab may be released by applying only a single finger or thumb to a release button located on the female member.

It is still another object of our invention to provide an animal collar equipped with a substantially flat component or tab member enabling the animal wearing the collar to be quickly attached to the seat belt of an automobile, to restrain the animal against injury should a collision occur, as well as to permit the animal to roam about the exterior of the automobile at such time as it has been parked with its doors left open.

It is yet still another object of our invention to provide an animal collar equipped with a substantially flat component or tab member enabling the animal wearing the collar to be quickly attached to any of several leashes of different length, and thereafter quickly released from such a leash, when desired, by the use of a single finger or thumb.

These and other objects, features and advantages will become more apparent from a study of the appended drawings.

BRIEF DESCRIPTION OF DRAWINGS

FIG. 3 is a perspective view to a larger scale of a typical leather collar upon which one of our novel, generally flat component or tab members of a first type is mounted, which component can carry certain indicia or information;

FIG. 4 is a showing of a generally flat component or tab member of a second type is illustrated, which is used in many automobiles of European manufacture;

FIG. 5 is a showing of a generally flat component or tab member of a third type is illustrated, which is used in certain domestic automobiles;

FIG. 6 is a perspective view illustrating the interfitting components that are to be brought together in latching relationship at such time as the particular leash being utilized at a given moment is to be affixed to the collar being worn by the animal;

FIG. 7a is a perspective view of a portion of the female member shown in FIG. 6, illustrated here in exploded relation, and containing a release button;

FIG. 7b is a perspective view of the interior portion of a typical female member of the type shown in FIG. 6, in this instance a type of leaf spring being used;

FIG. 7c is a view of a substantially flat and somewhat elongate component of a modified type;

FIG. 7d is a view of the interior of a female member of a type utilizing compression springs instead of a leaf spring;

FIG. 8 is a view showing how a large dog wearing a shoulder harness can be belted to an existing seat belt of an automobile, as a measure of safety as well as serving to keep the dog from moving between the seats of the automobile;

FIG. 9 is a view showing how the dog can be retained on a long leash permitting him to roam in the near vicinity of a parked automobile, left with its door open;

FIG. 10 reveals the benefit of utilizing a hook on a leash of moderate or long length, for such hook permits the dog or other animal to be hooked to a clothesline, along which the animal can run;

FIG. 11a is another showing of our short, looped-type leash;

FIG. 11b is another showing of our medium length leash, which is of adjustable length, and which is equipped with a hook member; and FIG. 11c is another showing of our long leash, which also is of adjustable length, and equipped with a hook member.

DETAILED DESCRIPTION

Figure 1:
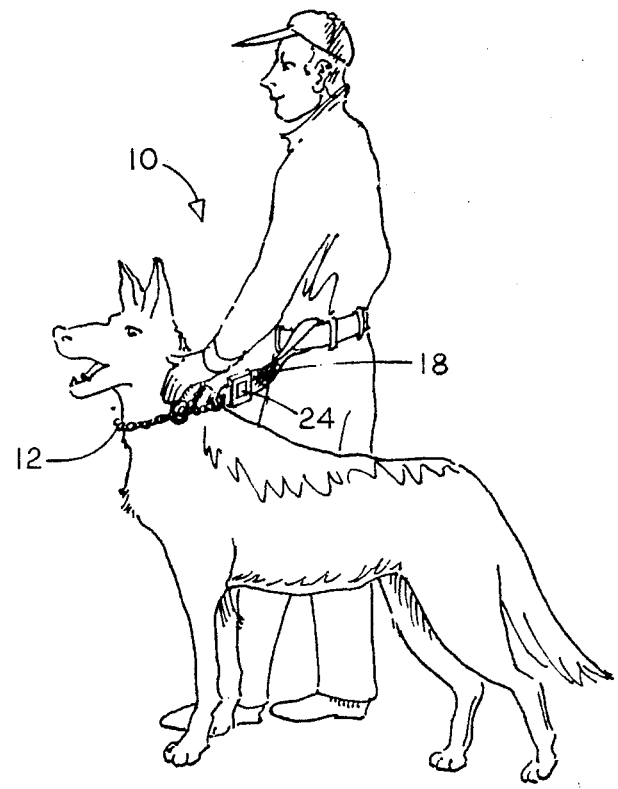
FIG. 1 is an illustration of the manner in which a large dog can be effectively restrained by the use of a leash and animal collar combination in accordance with this invention, in this instance a chain type collar.

Turning first to FIG. 1 it will there be seen that we have shown our novel leash and animal collar combination 10 in connection with a large dog, although it is to be understood that our novel combination of components is usable with other animals as well.

In FIG. 1 it is to be seen that a collar 12 extends around the neck of the dog, with it to be understood that the collar may be regarded as semi-permanently attached around the dog's neck. In the instance shown in FIG. 1, the collar 12 is metallic, being made of metal chain, but if the handler or trainer prefers, the collar may be non-metallic and in the nature of a collar 14 made of leather, plastic or the like, as shown to a larger scale in FIG. 3. Such a collar 14 is equipped with a conventional buckle 16 forming no part of the present invention.

In FIG. 3 we show an important part of our invention, a substantially flat member or component 20 of metal or hard plastic, that is attached to the collar 14 by means of a small attachment ring 22. The generally flat component 20 is somewhat elongate and configured to fit into a female attachment member 24 utilized on the end of a suitable leash, as will be discussed at some length hereinafter, so member 20 may be regardable as a male component or member.

It is therefore to be seen that we have provided an effective identification and latching component 20 for semi-permanent attachment to an animal collar, so as to enable ready attachment to, and one-finger release from, a leash provided at its end with a female member. Our novel, somewhat elongate component 20 is substantially flat and has thereon at least one notch or aperture, such as a rectangular opening 21, and for obvious reasons component 20 may be regardable as a male member. The female member we prefer to use has a slot therein as well as latching means in its interior, that is closely adjacent the slot, for releasably engaging the notch or aperture when the male component has been inserted into the slot. Conveniently, the female member is provided with a release button for operating the latching means, and quite importantly, the release button is operable with one finger, such that a one-handed release of the component, the collar, and the animal wearing the collar, can be readily effected.

Referring back to FIG. 1, it will be noted that the female attachment member 24 is utilized on a comparatively short leash 18 that may for example be looped around the trainer or handler's belt. It is important to note that even when the handler has released the dog or other animal, the collar 12 or 14, and the generally flat, elongate component or tab-like member 20 utilized on the collar, remain in place around the animal's neck, as clearly depicted in FIG. 2.

Figure 2:
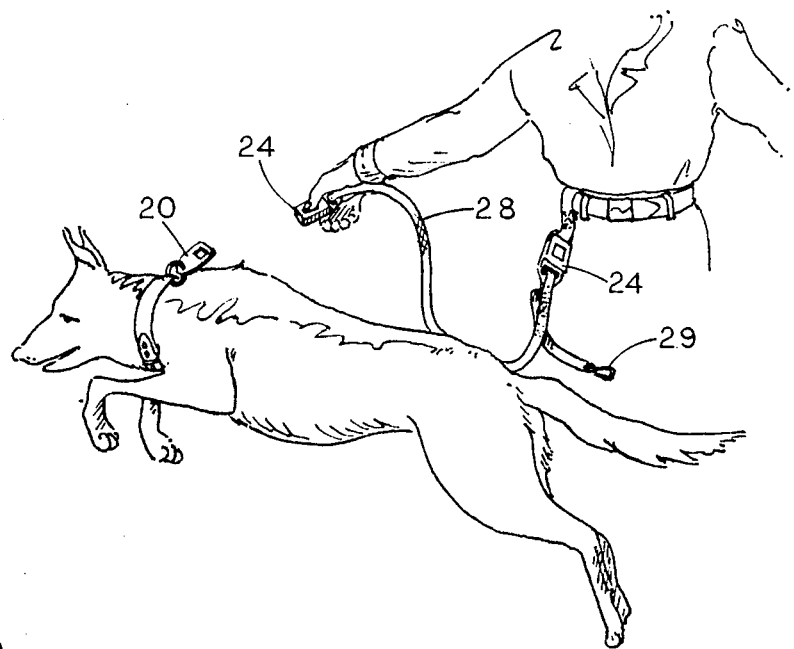
FIG. 2 reveals the highly advantageous one-handed release that is made possible by the use of our invention, and also made clear is the fact that upon release of the animal of FIG. 1, he still continues to wear the collar upon which a novel component or tab member in accordance with our invention has been affixed.

As will be noted in FIG. 2, the trainer or handler may prefer to make use of a medium length leash 28, and the medium length leash may be equipped with a hook 29 disposed on a short length of le ash material. As discussed at some detail hereinafter, the leash 28 is preferably of adjustable length.

It is to be realize d t hat in accordance with this invention, our generally flat, elongate component 20 attached to the animal collar is configured to be received in a female attachment member 24 of a type that may be secured at the end of any of a wide variety of leash lengths. Illustrative of this point is the fact that in FIG. 2, the medium length leash 28 is interposed between the short, belt-like leash 18 looped to the trainer or handler's belt, and the generally flat, somewhat elongate component or tab member 20 that is directly attached to the dog's collar 14.

One of the highly advantageous aspects of our invention is the fact that the female attachment member 24 that we use at the end of the short, looped leash 18, as well as at the end of the medium length leash and the long leash we may use, is configured to enable a one-handed release of the animal to be brought about. In other words, when as in FIG. 2 the trainer or handler is releasing the dog, he needs only apply thumb pressure to a release button located in the center portion of the female member 24 in order to effect release of the dog, and his other hand can be concerned with an entirely different matter, such as holding a package, the hand of a small child, or the like. Our invention is particularly well suited for use by a disabled person, who has only one usable arm.

Turning again to FIG. 3, it will be seen that the generally flat component 20 is shown to a larger scale, and it may be observed that various types of identification can be utilized thereon, such as the animal's name, the telephone of the owner, the most recent year of inoculation of the animal, and the like.

It is important to note in FIG. 3 that the generally rectangular hole 21 is located in a mi d portion of the essentially flat male component 20. It is to be understood that a slot 26, visible in FIG. 6, is provided in the end of the female attachment member 24, that is, in the end of the member 24 away from the leash 18.

As will be quickly apparent to any person who has ever worn a seat belt in an automobile or airplane, in order to effect latching, it is only necessary to bring the generally flat, elongate component 20 and the female attachment member 24 into the relationship shown in FIG. 6, and then insert the generally flat, elongate male component 20 or 20b into the slot 26 of the female member 24. The latching takes place automatically, and the trainer or handler need make no movement other than to insert the substantially flat, tab-like male component into the slot 26. Component 20b of FIG. 6 differs from component 20 by utilizing a pair of rounded side notches 23 in addition to the rectangular hole 21.

The female member 24 is equipped with a release button 25 located in its center portion, and as well understood, upon the trainer or handler thereafter pressing the release button 25 by the use of his or her thumb or finger, the elongate component 20 as well as the animal wearing the collar are quickly released.

With reference to FIGS. 6, 7a, 7b and 7d, it is to be realized that the female attachment member 24 is of a construction involving a base member 36 firmly attached to the leash 18. This attachment may include the use of a loop 38 forming an integral, structural part of the base member 36, through which loop the end of the leash extends, and is secured.

The cover member 34 depicted in FIG. 7a is readily insertable over the base member 36 in a manner so as to be tightly secured thereto; note FIG. 6. The base member 36 is typically of metal having upturned side edges 40, with it to be understood that the side edges are overlapped and tightly engaged by the interiors of the left and right edges of the cover member 34 at such time as the base member and the cover members are snapped together. The previously mentioned release button 25 is provided in a mid portion of the cover member 34, which button is arranged to interact with certain portions of the latching means of the base member 36, in a manner described hereinafter.

With continued reference to FIG. 7b, it is to be realized that forming an essential part of the base member 36 is a pivotally mounted latch member 46, with the pivot point being located at 48. A central portion of the end of the movable latch member 46 opposite the pivot location 48 has an upstanding tab portion 50, with it being the purpose of the tab 50 to engage the hole 21 to be found in a mid portion of the generally flat metallic or hard plastic component 20, when this component has been inserted into the slot 26 to be found in the end of the female attachment member 24.

The latch member 46 illustrated in FIG. 7b is revealed to be biased upwardly by a spring 52, which for example may be a type of leaf spring. Quite obviously, we are not to be limited to any particular type of spring for biasing the latching member 46 upwardly, and for example a suitable type of compression spring, usable singly or in pairs, may effectively serve the purpose of biasing the latch member upward.

Preferably an additional spring member 54, which may be integral with leaf spring 52, is mounted upon the base member 36, as revealed in FIG. 7b, with it being the function of the additional spring member to provide a bias slightly resisting the insertion of the generally flat component 20 into the slot 26 provided in the end of the female attachment member 24 remote from the leash 18. This additional bias serves to provide a slight expelling force to the remote end of the generally flat component 20, thus serving to assist the removal of the male component 20 from the female member 24 at such time as the handler presses the release button 25 by the use of his or her thumb or finger. Quite obviously we are not to be limited to the use of an additional spring member 54.

From the embodiment illustrated in FIG. 4 it can be seen that the elongate flat component 30 has a "T" shaped notch 31 therein instead of the rectangular hole 21 as utilized in the component 20 depicted in FIG. 3. The T-shaped notch 31 may be required in order for the male member 30 to properly interfit with some types of female members used on certain leashes.

Somewhat similarly, in FIG. 5 we show an elongate flat member or component 32 having side notches 33 therein, with this being the configuration required in order for a proper fit to take place with some types of female receptacle members. It is to be understood that on the components of both FIG. 4 and FIG. 5 may be utilized certain indicia of the type discussed hereinabove in connection with FIG. 3.

FIG. 7d is a view closely resembling FIG. 7b, and in FIG. 7d we show an embodiment of a female member, from which the cover member has been removed for clarity, in which a pair of compression springs 56 are utilized for upwardly biasing the latch member 66. The device of FIG. 7d is configured to properly receive the slotted male member 20c shown in FIG. 7c, with tab members 57 just above the springs 56 serving to engage slot portion 67 in the member 20c when latter member has been inserted into the slot of the female member.

From considering FIG. 6 in conjunction with FIGS. 7b and 7d it should now be understood that upon the elongate, generally flat component or tab member 20, 20b, 20c or the like mounted on the collar 12 or 14 being inserted into the slot at the end of a female member, such as member 24, the generally flat component travels inwardly until such time as the tab or tabs on the latch member 46 or 66 engage the hole located in the mid portion of the generally flat, elongate component 20, or, alternatively, other latching components in the female member engage the side notches 23 located on the component 20b, or the side notches 33 shown on the male member in FIG. 5.

Many uses of our invention will be apparent to those skilled in the art. For example, the handler or owner may have leashes of several different lengths, each of which is equipped with a female member adapted to receive our novel elongate male component 20, 20b, 20c, 30 or 32 mounted on the animal collar. In FIG. 11a we show the short, looped type leash 18, whereas in FIG. 11b we illustrate a leash 28 of moderate length, and in FIG. 11c we show a long leash 58. Obviously these leashes may be used singly or in combination.

Leashes 28 and 58 can each be equipped with a hook 29 located at the opposite end of the leash from the female member utilized as the receptacle for the male member. Each leash can be of a type to be held in the hand of the handler, or the handler can use a leash 18 on his or her belt, to which the other end of the leash may be readily attached.

It is important to note the use herein of a length adjustment device 60 on the leashes 28 and 58. This is a device of more or less conventional configuration, that has a pair of parallel slots therein, through which the webbed leash is interlaced. The device 60 also has therein a rectangular hole 61 corresponding to the hole 21 illustrated in FIG. 3, with it to be understood that the end of the device 60 nearest the hole 61 is configured so as to be received in the slot of a female member located at one end of another leash. As is well known, the webbed leash can be easily slid in a length-altering direction through the parallel slots in the body of the device 60 when there is no strain on the leash, whereas when the pull is on the end of the device containing the hole 61, the webbed leash cannot slide in the parallel slots in the body of the device 60. This is because when the leash has been correctly threaded through the parallel slots, a substantial amount of friction is created when the leash is under strain, that effectively prevents slippage of the leash material with respect to the parallel slots.

It is thus to be seen that the device 60 is a properly functioning device in what might be regarded as a chain of cooperating components, so that a fully effective restraint on the animal is provided.

A dog or other animal wearing a chain collar or leather collar upon which one of our novel flat components is attached, or else wearing a shoulder harness 70 of the type shown in FIG. 8 upon which one of our flat components is mounted, can be readily secured to an automobile seat belt, so that the animal can be protected should the car become involved in a collision. Also, the attachment arrangement depicted in FIG. 8 prevents the dog from undesirably moving around the interior of the automobile. Furthermore, after the automobile has been parked with its doors left open, as shown in FIG. 9, a different length leash can then be utilized, such that the dog can be allowed to roam around the car within a given radius. As mentioned hereinabove, the medium length and long length leashes are adjustable in length, and can be us ed singly or in combination with other such leashes.

Although our invention was primarily designed to be used in connection with animal collars and shoulder harnesses to be worn by animals, it is possible for a mother going shopping with a child of tender years, to attach one of our novel flat male components to a waistband or harness worn by the toddler. In that way, the parent could readily attach a leash in accordance with our invention to such male component, and have an effective leash of selected length. As is obvious, removal of the leash from the child at the appropriate time can be accomplished by the use of one finger.

Other advantages of our device will become apparent to those skilled in the art, and we are not to be limited except by the scope of the appended claims.

We claim:

1. A leash and collar or harness combination permitting a handler by the use of one finger or thumb to readily release a animal or child wearing the collar or harness, said combination comprising a collar or harness having means enabling it to be secured tightly yet comfortably around the animal or child in a semi-permanent manner, an essentially flat, somewhat elongate component regardable as a male member, secured to said collar or harness so as to protrude therefrom for at least one inch, and a flexible leash intended to be utilized in combination with said collar or harness, said leash having on one end a female latching member in which is disposed a slot for releasably receiving said essentially flat component, latching means located inside said female member adjacent said slot, which latching means is arranged to engage said essentially flat component at the time of its insertion, said latching means including a spring, said female member also having a single release button whereby the handler can readily move said latching means against the bias of said spring to a release position, said leash being attachable to said collar or harness merely by causing said essentially flat component to slide into said slot, where it automatically becomes latched, the release of the animal or child, even if struggling, being readily achieved by the handler pressing said release button to a sufficient extent as to overcome the bias of said spring.

2. The leash and animal collar combination as recited in claim 11 in which said essentially flat component has a hole in its midportion, which is automatically engaged by a tab on said latching means at such time as said essentially flat component has been inserted to a sufficient extent into said slot.

3. The leash and animal collar combination as defined in claim 1 in which said essentially flat component has a notch in at least one edge, that is engageable by said latching means at such time as said essentially flat component has been inserted for a sufficient extent into said slot.

4. The leash and animal collar combination as defined in claim 1 in which said component is made of metal.

5. The leash and animal collar combination as defined in claim 1 in which said component is made of hard plastic.

6. The leash and animal collar combination as defined in claim 1 in which said spring is a leaf spring.

7. The leash and animal collar combination as defined in claim 1 in which said spring involves at least one compression spring.

8. The leash and animal collar combination as defined in claim 1 in which said collar is made of leather.

9. The leash and animal collar combination as defined in claim 1 in which said collar is metallic, of chain type construction.

10. The leash and animal collar combination as defined in claim 1 in which said collar is made of plastic.

* * * * *